I. Brown,
Reciprocating Saw Mill.
No. 425 . Reissued Feb. 3, 1857
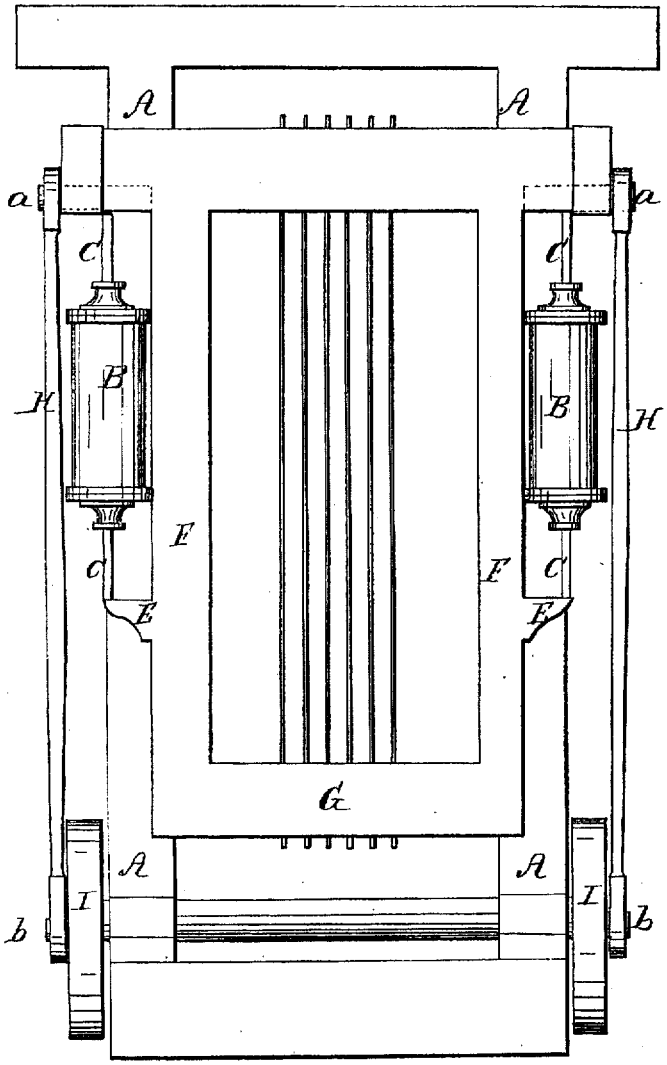
AM. PHOTO-LITHO. CO. N.Y. (OSBORNE'S PROCESS)

UNITED STATES PATENT OFFICE.

BEST AVAILABLE COPY

ISAAC BROWN, OF BALTIMORE, MARYLAND.

IMPROVEMENT IN METHOD OF DRIVING RECIPROCATING SAWS.

Specification forming part of Letters Patent No. 9,855, dated July 19, 1853; Reissue No. 425, dated February 3, 1857.

*To all whom it may concern:*

Be it known that I, ISAAC BROWN, of Baltimore, in the county of Baltimore and State of Maryland, have invented certain new and useful Improvements in the Method of applying the Power of Steam to Saw-Mill Gates or Frames; and I do hereby declare the following to be a full, clear, and exact description of the same, reference being had to the accompanying drawing, making a part of the specification.

The nature of my invention consists in so applying the power of steam to the saw gate or frame of a saw-mill as that, if the said gate or frame should vibrate laterally or otherwise run out of line, said defect shall not be communicated to the piston or cylinder, and cut, cramp, or otherwise injure them.

To enable others skilled in the art to make and use my invention, I will proceed to describe the same with reference to the drawing.

The fender-posts A may be substantially formed of wood, iron, or parts of each, and I firmly attach thereto the steam-cylinders B C, of any of the ordinary constructions, and through said cylinders, in proper stuffing-boxes, I pass a piston-rod, C, furnished with a single piston-head, and extending sufficiently far beyond each end of the cylinder so that one end of each of said rods may be almost in contact with the under side of the projecting top piece D of the saw-frame, and the other end of said rods may be also nearly in contact with brackets E, formed on the outside of each of the pieces F of said frame. The rods C should have just play enough between the top of the gate and the brackets to allow for expansion of the metal and prevent cramping or binding; and they may, instead of working against the brackets, extend down to the bottom-piece G of the frame and work against projections thereon similar to those in the top-piece D; but this will only require longer and heavier piston-rods without achieving any desirable object unless unusual length of vibration or stroke is required. The rods should work close enough between the projections and the brackets to prevent slamming or wearing, and it may be found advisable to insert a piece of prepared rubber or other spring between the rods and the projections. The object in leaving the rods unconnected from the gate or frame is for the purpose of preventing the play of the gate from being communicated to the pistons and causing them to cut or bind in the packing or cylinder, which would be the case if attached, for then the top of the gate would serve as a cross-head, and all the lateral vibrations or strainings of the gate would be communicated directly to the piston-rods. By my arrangement the pistons will work true in the cylinders whether the gate works out of line or not.

On the top-piece of the gate, at each end thereof, and connnected thereto by wrist-pins *a a*, are the pitmen or connecting rods H H, their lower ends being also similarly connected by wrist-pins *b b* to the fly-wheels I I on the shaft J, and said fly-wheels may be counterbalanced to facilitate the vibrations of the gate.

The carriage or feed-rollers for feeding up the material to be sawed may be of the usual well-known forms of construction, and may be operated by the engine in a manner well known to mechanicians.

I have represented in the drawing two cylinders and a gang of saws. A single cylinder and one or more saws may be used, in which case the cylinder and piston-rod may work within the vertical side pieces of the gate, or near enough to its center to properly balance it, and the saws may be hung to the projecting ends of the top and bottom pieces of the gate. I have also represented the pistons as moving and the cylinders as being stationary; but the cylinder may be made to move and carry the gate, while the rods may be fixed or immovable, and, although not so mechanical, would produce the same result.

Having thus fully described the nature of my invention, what I claim therein as new, and desire to secure by Letters Patent, is—

1. The mode herein described of applying the power of the engine to the saw gate or frame without being permanently connected therewith, so that the piston shall in a great measure be relieved from any lateral motion which the gate may have which causes it to bind or cut in the cylinder, substantially as described.

2. Driving one or more saws between two cylinders, as well as driving one or more saws on each side of a single cylinder, and the self-adjustable piston-rod or the self-adjustable slides, which accomplish the same result as are hereinbefore described.

ISAAC BROWN.

Witnesses:

F. W. ECKLOFF,

JOHN S. HOLLINGSHEAD.